United States Patent
Uller et al.

(10) Patent No.: US 12,503,312 B2
(45) Date of Patent: Dec. 23, 2025

(54) CENTRAL BELT SYSTEM AND METHOD FOR PICKING ARTICLES

(71) Applicant: KNAPP AG, Hart bei Graz (AT)

(72) Inventors: Klaus Uller, Hart bei Graz (AT); Franz Mathi, Hart bei Graz (AT)

(73) Assignee: KNAPP AG, Hart bei Graz (AT)

( * ) Notice: Subject to any disclaimer, the term of this patent is extended or adjusted under 35 U.S.C. 154(b) by 672 days.

(21) Appl. No.: 17/904,622

(22) PCT Filed: Jan. 20, 2021

(86) PCT No.: PCT/AT2021/060019
§ 371 (c)(1),
(2) Date: Aug. 19, 2022

(87) PCT Pub. No.: WO2021/168489
PCT Pub. Date: Sep. 2, 2021

(65) Prior Publication Data
US 2023/0114961 A1    Apr. 13, 2023

(30) Foreign Application Priority Data
Feb. 27, 2020 (AT) .............................. A 50145/2020

(51) Int. Cl.
*B65G 1/137* (2006.01)
*B65G 43/08* (2006.01)
*B65G 47/04* (2006.01)

(52) U.S. Cl.
CPC ........... *B65G 1/1376* (2013.01); *B65G 43/08* (2013.01); *B65G 47/04* (2013.01); *B65G 2201/02* (2013.01)

(58) Field of Classification Search
CPC .... B65G 47/681; B65G 47/71; B65G 65/005; B65G 43/08
See application file for complete search history.

(56) References Cited

U.S. PATENT DOCUMENTS

| 5,755,552 A | 5/1998 | Iwasaka et al. |
| 2015/0136570 A1* | 5/2015 | Stelzer ................ B65G 1/1373 198/810.01 |

FOREIGN PATENT DOCUMENTS

| DE | 102012006150 A1 | 10/2013 |
| EP | 0183074 A1 | 6/1986 |

OTHER PUBLICATIONS

International Search Report, mailed May 21, 2021, from PCT Application No. PCT/AT2021/060019.

\* cited by examiner

*Primary Examiner* — Huan Le
(74) *Attorney, Agent, or Firm* — Workman Nydegger

(57) ABSTRACT

A method and a central belt system for order-picking articles into order packages transported with a container conveyor, having a central belt which has a conveying direction toward the container conveyor, with the central belt having first and second belt areas in the transverse direction to the conveying direction, and having first and second article chutes associated with the first and second belt areas for ejecting articles into the first and second belt areas. The central belt system has a control in order to eject articles from the first article chutes during a first time window according to a first order and to eject articles from the second article chutes during a second time window according to a second order.

10 Claims, 2 Drawing Sheets

CENTRAL BELT SYSTEM AND METHOD FOR PICKING ARTICLES

The present application is a U.S. National Stage of International Application No. PCT/AT2021/060019, filed on Jan. 20, 2021, designating the United States and claiming the priority of Austria Patent Application No. A 50145/2020 filed with the Austria Patent Office on Feb. 27, 2020. All of the aforementioned applications are incorporated herein in their respective entireties by this reference.

The invention relates to a central belt system for order-picking articles into order packages transported with a container conveyor, comprising at least one central belt which has a conveying direction toward the container conveyor, with the central belt having at least a first and a second belt area in the transverse direction to the conveying direction, and comprising first and second article chutes associated with the respective first and second belt areas for ejecting articles into the respective first and second belt areas.

STATE OF THE ART

Central belt systems are known from the prior art (DE 10 2012 006 150 A1) in which articles are ejected according to an order from article chutes arranged on either side of a central belt onto the respective side of the central belt and are jointly order-picked into an order package of a container conveyor. However, such central belt systems are suitable only to a limited extent for applications in which many small orders from a large product range have to be order-picked, since the ejection times from the article chutes severely limit the throughput. This is true in particular if equal articles have to be ejected often one after the other.

Especially if a large number of small orders from a large product range are to be order-picked, as is the case, for example, in the field of electronic trading in pharmaceuticals, such serially operating systems quickly reach their performance limits.

DISCLOSURE OF THE INVENTION

It is therefore the object of the present invention to provide a central belt system of the initially mentioned kind, which is able to obtain a high throughput during order-picking in a structurally simple manner.

The invention achieves the object that is posed in that the central belt system has a control in order to eject articles from the first article chutes during a first time window according to a first order and to eject articles from the second article chutes during a second time window according to a second order, with the first and second article chutes having an identical range of articles and the first and second time windows being synchronized with one another, and that at least a first and a second order package are provided on the container conveyor in order to order-pick the articles from the first and second belt areas on the central belt into the respective first and second order packages on the container conveyor.

If the central belt system has a control for ejecting articles from the first article chutes during a first time window according to a first order and for ejecting articles from the second article chutes during a second time window according to a second order, parallel processing of at least two orders can be enabled on a single central belt. The articles from the first article chutes can then be ejected into a first belt area and the articles from the second article chutes into a second belt area on the central belt. The processing of the first and second orders can thus, in each case, take place in a separate time window without the articles being mixed or, respectively, affecting each other in the first and second belt areas. In this way, a reliable central belt system can be created, which allows the orders to be picked in parallel.

A central belt system with a higher throughput of orders can be created if the first and second article chutes have an identical range of articles, i.e., the same products can be ejected simultaneously into the first and second belt areas on the central belt. Parallel processing of orders from the same range of articles on a single central belt can thus be enabled. In addition to a higher throughput, the central belt system can also be implemented in a structurally simple and cost-efficient manner, since there is no need to provide several expensive central belts in the system that are independent of one another.

If at least a first and a second order package are furthermore provided on the container conveyor, the articles from the first and second belt areas can be order-picked independently of one another into the respective first and second order packages on the container conveyor.

If the first and second time windows for ejecting articles from the first and second article chutes into the first and second belt areas are synchronized with one another, the throughput of the central belt system can be increased further. In doing so, the control can synchronize the first and second time windows in such a way that simultaneous order-picking of the articles from the first and second belt areas into the respective first and second order packages on the container conveyor is enabled. In each case, the central belt system according to the invention can thus eject articles according to a first and a second order onto a first and a second belt side of the central belt during the synchronized first and second time windows, order-picking them into a first and a second order package on the container conveyor.

The advantages of the central belt system according to the invention can take effect especially during the processing of small orders. For example if two orders consisting of equal articles are to be processed, the central belt system according to the invention can save a significant amount of time in comparison to serial processing of the orders. Especially in case of orders with a small number of articles or several identical articles, the ejection times of the articles from the article chutes predominate, which leads to downtimes or, respectively, delays on the central belt. By contrast, the control of the central belt system according to the invention can ensure that orders are distributed between the first and second article chutes in such a way that downtimes or, respectively, delays on the central belt are avoided.

If the central belt furthermore has a separating device for separating the first and second belt areas, the central belt system can reliably ensure that the articles in the first and second belt areas do not get mixed up. Such intermingling may happen in particular if articles are ejected from the article chutes into a belt area with a specific impulse, which causes the articles to move at least partially into the other belt area. This can be reliably counteracted with the separating device according to the invention.

The above-mentioned advantages can be realized in particular if the separating device is designed as a separating curtain or a separating web on the central belt. For example, the separating web can be a web that is connected to the central belt and moves with it, while the separating curtain can be a curtain that is separate from the central belt and reliably separates the belt areas.

If a tray is furthermore provided in order to transport the first and second order packages jointly on the container conveyor, the articles of the first and second orders, which are each picked into the first and second order packages, can be transported jointly in one tray on the container conveyor. A structurally simple central belt system can thus be created.

The throughput of the central belt system can be increased further if the control is designed for synchronizing the first and second ones with a stop position of the tray on the container conveyor. By synchronizing the first and second time windows, in which articles are, in each case, ejected from the first and second article chutes into the first and second belt areas, it is possible to simultaneously order-pick the articles from the first and second belt areas into the respective first and second order packages on the container conveyor. If the first and second time windows are now additionally synchronized with a stop position of the tray, which has the two order packages on the container conveyor, the first and second orders can be picked in parallel during a single stop position of the tray. Hence, there is no need for the tray to have several stop positions for fulfilling the orders, whereby delays and, respectively, downtimes can again be reliably avoided.

Furthermore, the central belt system according to the invention can have third and fourth article chutes associated with the respective first and second belt areas for ejecting articles into the respective first and second belt areas.

This can be particularly advantageous if the first and second article chutes contain articles of a category A (e.g., fast-moving items) and the third and fourth article chutes contain articles of a category B (e.g., medium or slow-moving items that are ordered less frequently).

For example, it is conceivable that the first and second article chutes have an identical article range of articles of category A, while the third and fourth article chutes have a different article range of articles of category B. For example, articles of category B, which are to be picked less frequently, can be kept in stock in additional third and fourth article chutes and the orders can be allocated by the control to the first or second belt areas for processing, whereby a particularly flexible and efficient central belt system can be provided.

Furthermore, it is an object of the invention to provide a more efficient method of order-picking articles via a central belt according to the preamble of claim 7.

The invention achieves the object that is posed in that the first and second article chutes have an identical range of articles and articles are ejected from the first article chutes into the first belt area during a first time window according to a first order and articles are ejected from the second article chutes into the second belt area during a second time window according to a second order, and wherein the articles are order-picked from the first and second belt areas into different order packages on the container conveyor.

If the first and second article chutes have an identical range of articles and articles are ejected from the first article chutes into the first belt area during a first time window according to a first order and articles are ejected from the second article chutes into the second belt area during a second time window according to a second order, an efficient method of parallel order-picking of at least a first and a second order can be provided. Due to the identical range of articles in the first and second article chutes, orders for identical articles can be handled in parallel on the central belt in that, in each case, the articles are ejected from the first article chutes into the first belt area according to a first order and the articles are ejected from the second article chutes into the second belt area according to a second order. This processing or, respectively, handling of the orders can, in each case, take place in a separate time window, whereby the article chutes can also be actuated independently of one another in order to eject articles onto the central belt.

If the articles are order-picked from the first and second belt areas into different order packages on the container conveyor, the articles ejected in parallel and independently of one another onto the central belt can also be order-picked separately into at least a first and a second order package.

Using the method according to the invention, articles can thus, in each case, be ejected onto a first and a second belt side of the central belt during the first and second time windows according to a first and a second order and can be order-picked into a first and a second order package on the container conveyor. In doing so, there is, in particular, no intermingling between the articles in the first and second belt areas, and a completely independent, parallel fulfillment of the orders is facilitated. An efficient and simple order-picking method can thus be created.

In doing so, the different order packages are preferably transported jointly in a tray on the container conveyor.

If the first and second time windows in which the articles are ejected from the first and second article chutes into the respective first and second belt areas are synchronized with one another, the method can enable efficient and essentially simultaneous processing of the first and second orders.

This is the case, in particular, if the first and second time windows for ejecting the articles from the first and second article chutes are synchronized with a stop position of the container conveyor. In this connection, it has been shown, among other things, that the procedural economy is improved as there are fewer waiting times on the central belt between orders, since the articles can be ejected in parallel from the respective article chutes onto the central belt according to the first and second orders and can be order-picked from the central belt into the first and second order packages on the container conveyor.

BRIEF DESCRIPTION OF THE DRAWINGS

Hereinafter, preferred embodiment variants of the present invention are illustrated in further detail with reference to the drawings. The following is shown by the following figures.

WAYS OF IMPLEMENTING THE INVENTION

Figure 1:
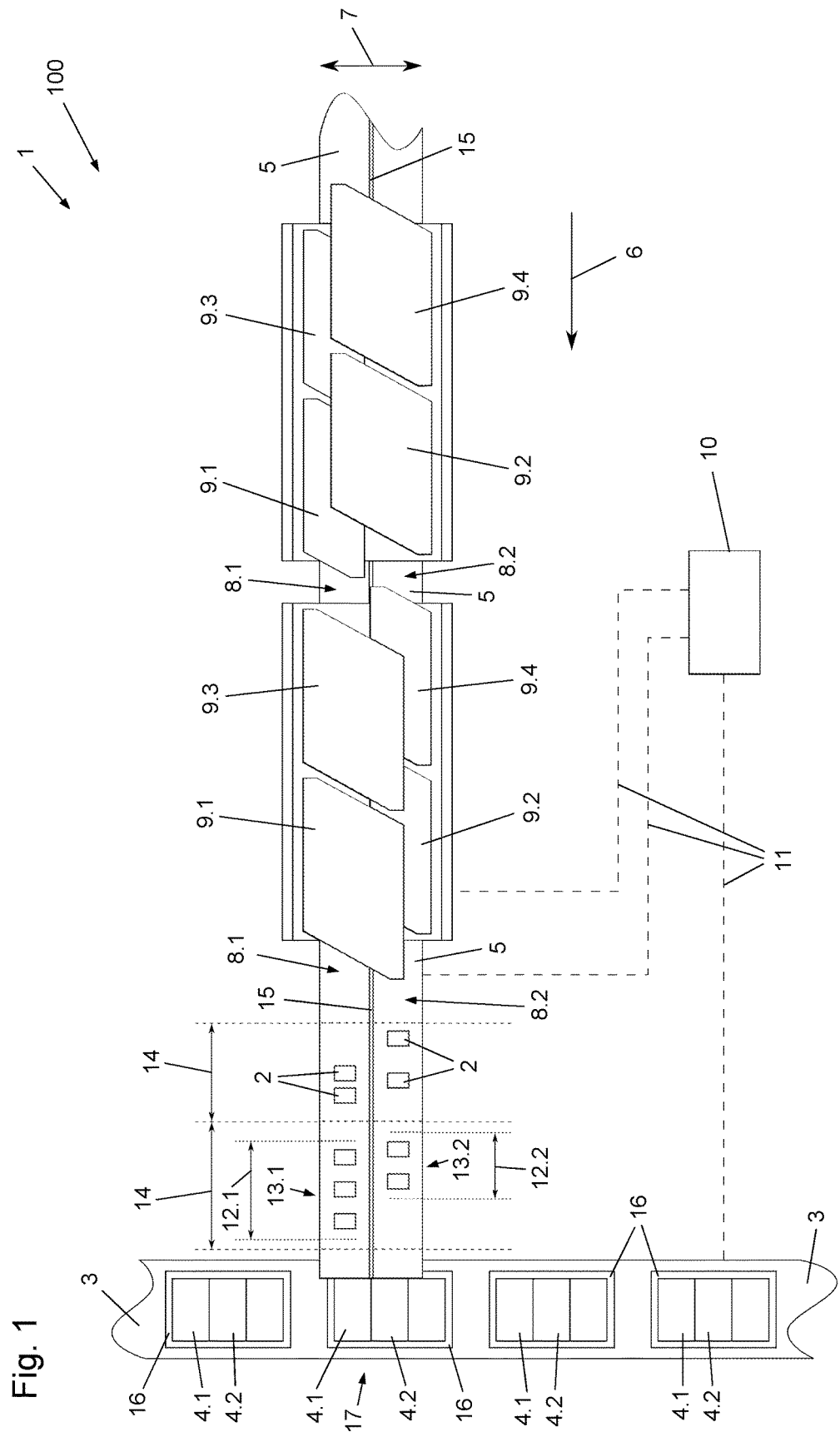
FIG. 1: a schematic plan view of the central belt system according to a first preferred embodiment variant.
Figure 2:
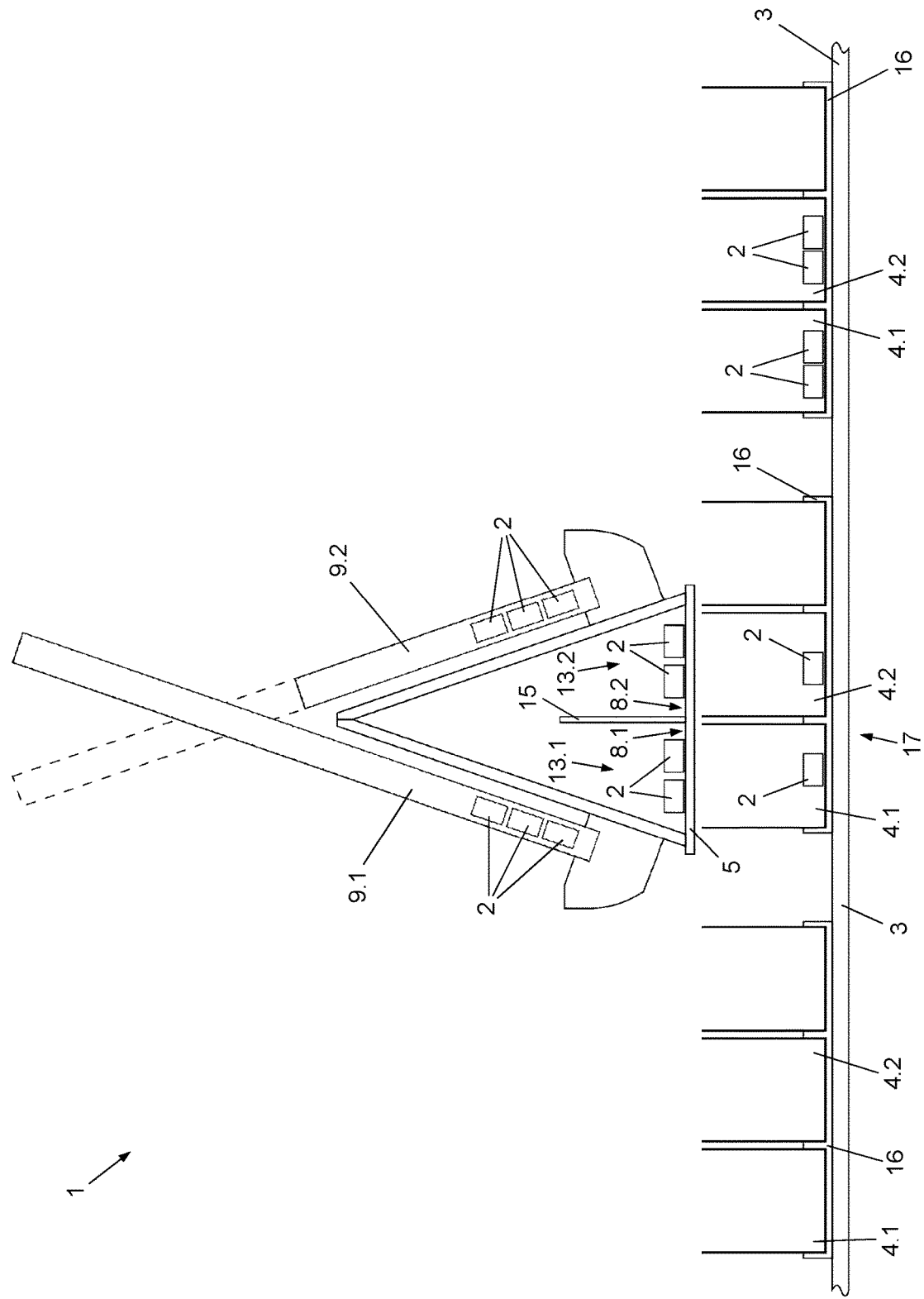
FIG. 2: a schematic cross-sectional view of the central belt system of FIG. 1.

FIG. 1 shows a plan view of a central belt system 1 according to the invention for order-picking articles 2 into order packages 4.1, 4.2 transported with a container conveyor 3. In addition, a schematic cross-sectional view of the central belt system 1 is depicted in FIG. 2.

The central belt system 1 has a central belt 5 on which articles 2 are transported toward the container conveyor 3 in the conveying direction 6. In the transverse direction 7 to the conveying direction, the central belt 5 has at least a first belt area 8.1 and a second belt area 8.2, with at least first article chutes 9.1 being associated with the first belt area 8.1 and at least second article chutes 9.2 being associated with the second belt area 8.2. Articles 2 are stored in the article chutes 9.1, 9.2 and can be ejected, as required, into the respective associated belt area 8.1, 8.2 on the central belt 5. A separating device 15 for separating the belt areas 8.1, 8.2 is provided on the central belt 5 between the belt areas 8.1, 8.2. In this case, the separating device 15 is provided as a separating curtain 15. In a further embodiment variant, the separating device 15 can also be designed as a separating web.

In a further embodiment variant, the central belt 5 may also have a third or further belt area, which, however, has not been depicted in further detail in the figures.

In addition, the central belt system 1 has a control 10 which controls the article chutes 9.1, 9.2, the central belt 5 and the container conveyor 3 via control signals 11. In this case, the control 10 ensures that, during a first time window 12.1, articles 2 are ejected from the first article chutes 9.1 into the first belt area 8.1 on the central belt 5 according to a first order 13.1 and, during a second time window 12.2, articles 2 are ejected from the second article chutes 9.2 into the second belt area 8.2 on the central belt 5 according to a second order 13.2.

In this case, the first and second article chutes 9.1, 9.2 have the same range of articles. Hence, all articles 2 which can be processed by the orders 13.1, 13.2 can be found identically in the first and second article chutes 9.1, 9.2. As a result, the control 10 can allocate the pending orders optionally as a first or a second order 13.1, 13.2 for ejecting articles 2 from the first or second article chutes 9.1, 9.2, depending on the current usage of the belt areas 8.1, 8.2 and the article chutes 9.1, 9.2.

At least a first order package 4.1 and a second order package 4.2 are provided on the container conveyor 3. The articles 2 of the first order 13.1, which have been ejected from the first article chutes 9.1 into the first belt area 8.1, are order-picked into the first order package 4.1. Similarly, the articles 2 of the second order 13.2, which have been ejected from the second article chutes 9.2 into the second belt area 8.2, are order-picked into the second order package 4.2. Moreover, the order packages 4.1, 4.2 are provided in a common tray 16 on the container conveyor 3 so that they are transported jointly and assume a common stop position 17 in front of the central belt 5.

The first and second time windows 12.1, 12.2 are synchronized with one another so that they fall within a higher-level time window 14, in which the first and second orders 13.1, 13.2 are processed. This higher-level time window 14 is, in turn, synchronized with the stop position 17 of a tray 16 on the container conveyor 3 so that the articles 2 are ejected in parallel onto the central belt 5 during the time window 14 according to the first and second orders 13.1, 13.2 and are order-picked into the respective order package 4.1, 4.2.

In a further embodiment variant, which is not illustrated any further in the figures, a third or further order package may also be provided on the container conveyor 3. For example, the third order package may serve for the manual order-picking of products during the time window 14.

In the embodiment variant illustrated in FIG. 1, the central belt system 1 furthermore comprises third article chutes 9.3 associated with the first belt area 8.1 and fourth article chutes 9.4 associated with the second belt area 8.2. In this case, the third and fourth article chutes 9.3, 9.4 have article ranges that are different from each other. Articles 2 from the third article chutes 9.3 can thereby be ejected into the first belt area 8.1, and articles 2 from the fourth article chutes 9.4 can be ejected into the second belt area 8.2 on the central belt 5. In this way, orders comprising articles from the range of articles in the first and second article chutes 9.1 and 9.2 and articles from the range of articles in the third article chutes 9.3 can be order-picked into the first order package 4.1 on the first belt area 8.1. Likewise, orders comprising articles from the range of articles in the first and second article chutes 9.1 and 9.2 and articles from the range of articles in the fourth article chutes 9.4 can be order-picked into the second order package 4.2 on the second belt area 8.2. The control 10 is designed for allocating the orders accordingly.

In a further embodiment variant, which is not illustrated any further in the figures, the first and second article chutes 9.1, 9.2 can contain articles 2 of a category A, and the third and fourth article chutes 9.3, 9.4 can contain articles 2 of a category B. For example, articles 2 of category A may be fast-moving products, while articles of category B may be medium or slow-moving products.

It may be mentioned that the first article chutes 9.1 can, but do not have to, be arranged on the central belt 5 opposite the second article chutes 9.2. Likewise, the third article chutes 9.3 can be arranged on the central belt 5 opposite the fourth article chutes 9.4, but do not have to be arranged opposite. It would also be possible that only third article chutes 9.3 and no fourth article chutes 9.4 are provided. Furthermore, it would be possible that the first article chutes 9.1 and the second article chutes 9.2 with an identical range of articles each form only part of a central belt machine and the third and fourth article chutes 9.3 and 9.4 are formed by the remaining part of the article chutes of this central belt machine.

It may be mentioned that more than three order packages or just the two order packages 4.1 and 4.2 may also be provided on one tray. Furthermore, it would be possible to divide the central belt into three or more belt areas by further separating devices and to perform order-picking into all of these belt areas from the first and second article chutes.

The invention claimed is:

1. A central belt system comprising a container conveyor operable to convey order packages transported on the container conveyor, the central belt system comprising at least one central belt which has a conveying direction toward the container conveyor, with the central belt having at least a first and a second belt area in a transverse direction to the conveying direction, and comprising first and second article chutes associated with the respective first and second belt areas and each associated with respective articles according to a range of articles and designed for ejecting the articles into the respective first and second belt areas, respectively, wherein the central belt system has a control operable to eject articles from the first article chutes during a first time window according to a first order and to eject articles from the second article chutes during a second time window according to a second order, with the first and second article chutes having an identical range of articles and the first and second time windows being synchronized with one another, and the container conveyor is configured to have thereon at least a first and a second order package in order to order-pick the articles, which have been ejected onto the central belt in parallel and independently of one another, from the first and second belt areas on the central belt in parallel into the respective first and second order packages on the container conveyor.

2. A central belt system according to claim 1, wherein the central belt has a separating device operable to separate the first and second belt areas.

3. A central belt system according to claim 2, wherein the separating comprises a separating curtain or a separating web.

4. A central belt system according to claim 1, wherein a tray is provided in order to transport the first and second order packages jointly on the container conveyor.

5. A central belt system according to claim 4, wherein the control is operable to synchronize the first and second time windows for ejecting the articles from the first and second article chutes with a stop position of the tray on the container conveyor.

6. A central belt system according to claim 5, wherein the central belt system has third and fourth article chutes associated with the respective first and second belt areas configured to eject articles into the respective first and second belt areas.

7. A central belt system according to claim 6, wherein the first and second article chutes are configured to contain articles of a category A, and the third and fourth article chutes are configured to contain articles of a category B.

8. A method of order-picking articles via a central belt into order packages transported with a container conveyor, wherein articles are, in each case, ejected from first and second article chutes into a first and a second belt area on the central belt, wherein the first and second article chutes have an identical range of articles and that articles are ejected from the first article chutes into the first belt area during a first time window according to a first order and articles are ejected from the second article chutes into the second belt area during a second time window according to a second order, and wherein the articles are order-picked from the first and second belt areas into different order packages on the container conveyor.

9. A method according to claim 8, wherein the different order packages are transported jointly in a tray on the container conveyor.

10. A method according to claim 8, wherein the first and second time windows for ejecting the articles from the first and second article chutes are synchronized with a stop position of the container conveyor.

* * * * *